United States Patent [19]

Clark

[11] Patent Number: 4,689,891
[45] Date of Patent: Sep. 1, 1987

[54] LOCATOR AND FIXTURE ASSEMBLY

[76] Inventor: Thomas R. Clark, 15400 Kellogg Rd., Bowling Green, Ohio 43402

[21] Appl. No.: 925,240

[22] Filed: Oct. 31, 1986

[51] Int. Cl.$^4$ .......................... G01B 3/14; G01B 5/20
[52] U.S. Cl. ........................................ 33/529; 33/562
[58] Field of Search ................ 33/501, 529, 545, 549, 33/562, 573; 292/164, 174, 175

[56] References Cited

U.S. PATENT DOCUMENTS

| | | | |
|---|---|---|---|
| 24,450 | 6/1859 | Emery | 292/175 |
| 2,180,253 | 11/1939 | Moore | 292/175 |
| 2,477,524 | 7/1949 | Oswald et al. | 292/175 |
| 2,874,456 | 2/1959 | Weidel | 33/529 |
| 3,626,507 | 12/1971 | Hawkins | 292/175 |
| 4,122,608 | 10/1978 | Hopf | 33/549 |
| 4,593,476 | 6/1986 | Clark et al. | 33/529 |
| 4,604,813 | 8/1986 | Kawanami et al. | 33/529 |

*Primary Examiner*—Richard R. Stearns
*Attorney, Agent, or Firm*—Marshall & Melhorn

[57] ABSTRACT

A fixture assembly for inspecting a formed hollow tube includes a base defining an upper working surface in which is formed an envelope groove having a generally U-shaped cross-section for defining an error envelope for the tube. A locator block is positioned at either end of the error groove and includes a locator pin adapted to engage a free end of the tube for defining a central position in the envelope groove. Each locator block has an internal cavity formed therein for retaining a helical spring through which the locator pin extends, the spring being trapped between a wall of the cavity and a radially outwardly extending flange formed on the pin for biasing the pin toward the end of the envelope groove. The pin can include indicia for cooperating with the locator block to indicate the position of the free end of the tube and the end of the locator pin can be sized to provide an indication of the inside diameter of the free end of the tube.

16 Claims, 4 Drawing Figures

LOCATOR AND FIXTURE ASSEMBLY

BACKGROUND OF THE INVENTION

The invention concerns a part checking fixture and, in particular, a fixture for verifying the configuration of a curved hollow tube.

Many tubular parts are formed as a series of curved and straight portions to achieve a desired configuration. Of course, each curved and straight portion has a set of tolerances associated with it. Therefore, some method of checking the configuration must be used in order to determine that the ends of the tube can be connected where desired and the tube will follow a path between the ends which will not interfere with anything positioned therealong. The acceptable path is known as an "error envelope".

Although well known, the "error envelope" is difficult to check since each set of tolerances for a portion is dependent upon all of the other sets of tolerances for the part in order to determine an acceptable position for the part in space. One known method of checking tolerances is to utilize blocks to locate the straights of a tube or a hose. A second known method utilizes a rigid fixture with saddle gages that indicate the deviations of the tube straights from the nominal dimensions. Another known method of checking a part is to build the "error envelope" into a fixture into which the parts are inserted. The ends of the tubular parts are located utilizing pins inserted through an aperture in a block on the fixture and engaging an open end of the tubular part. However, such pins commonly are lost thereby rendering the fixture unfit for use until a replacement pin is provided.

SUMMARY OF THE INVENTION

The present invention solves the problems of the prior art fixtures by providing an "error envelope" fixture including a spring biased locating pin for each end of the hollow tube. In addition to positioning the hollow tube in the fixture, the locator pins can be utilized to check for the minimum internal diameter of the tubing and the locations for the ends of the tubing. Each of the pins can have one or more indicia formed thereon for cooperation with a mounting block to indicate the distance between the end of the tube engaged by a step on the pin and a predetermined position on the fixture.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENTS

Figure 1:
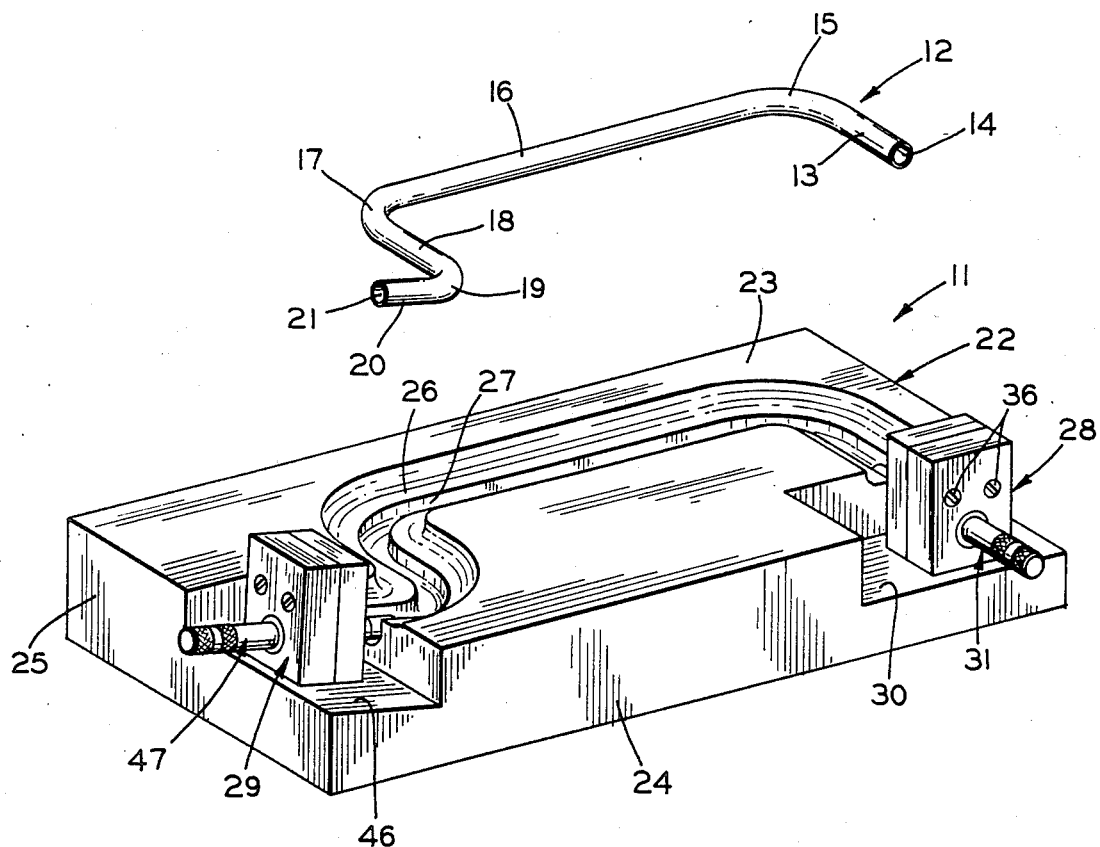
FIG. 1 is a perspective view of a fixture embodying the present invention and an associated hollow tube part to be checked in the fixture.

There is shown in FIG. 1, in perspective view, a fixture 11 for verifying the configuration of a hollow tube part 12. The tube 12 has been formed to a predetermined configuration in a manufacturing process. For example, a first generally straight section 13 has a free end 14 at one end thereof and joins a curved section 15 at the other end thereof. The curved section 15 is connected to one end of a second straight section 16 which has its other end connected to a second curved section 17. The second curved section 17 is connected to one end of a third straight section 18 which has another end connected to a third curved section 19. The third curved section 19 is connected to one end of a fourth straight section 20 which has its opposite end formed as a second free end 21. The tube 12 is merely representative of a typical hollow tubular part having at least one free end, one curved section and one straight section. Furthermore, at least one of the curved and straight sections has a longitudinal axis which must be defined in X-Y-Z cartesian coordinates.

Figure 3:
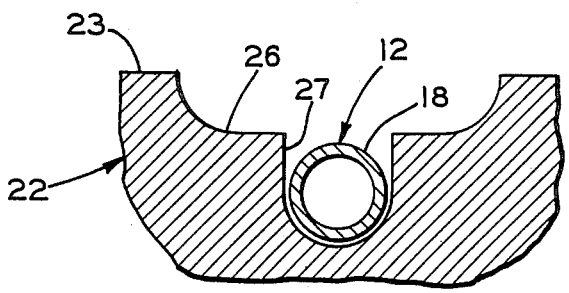
FIG. 3 is an enlarged, fragmentary cross-sectional view taken along the line 3—3 in FIG. 2.

The fixture 11 is typically formed as a block or base 22 having an upwardly facing working surface 23 bounded by generally horizontally extending sidewalls such as a front wall 24 and an end wall 25. The working surface 23 has a relatively wide working channel 26 formed therein of sufficient size to allow clearance for the tube 12 and either a human hand or tool for inserting the tube 12 and retracting the tube 12 with respect to an envelope groove 27 formed in the bottom of the working channel 26. The envelope groove 27 conforms to the outer surface of the "error envelope" for the tube 12. FIG. 3 shows a typical cross-section through the working channel 26 and envelope groove 27 with the tube 12 suspended in the groove 27 as will be discussed below. The groove 27 is generally U-shaped with the width and the height being equal to the maximum diameter of the "error envelope" for the corresponding section of the tube 12. For example, in FIG. 3, the third straight section 18 is shown as being located entirely within the groove 27 so that it checks as being within the "error envelope". If the section 18 either interfered with one of the sidewalls of the groove 27 or extended above the top of the groove 27, it would be considered to be out of tolerance and unacceptable.

Figure 2:
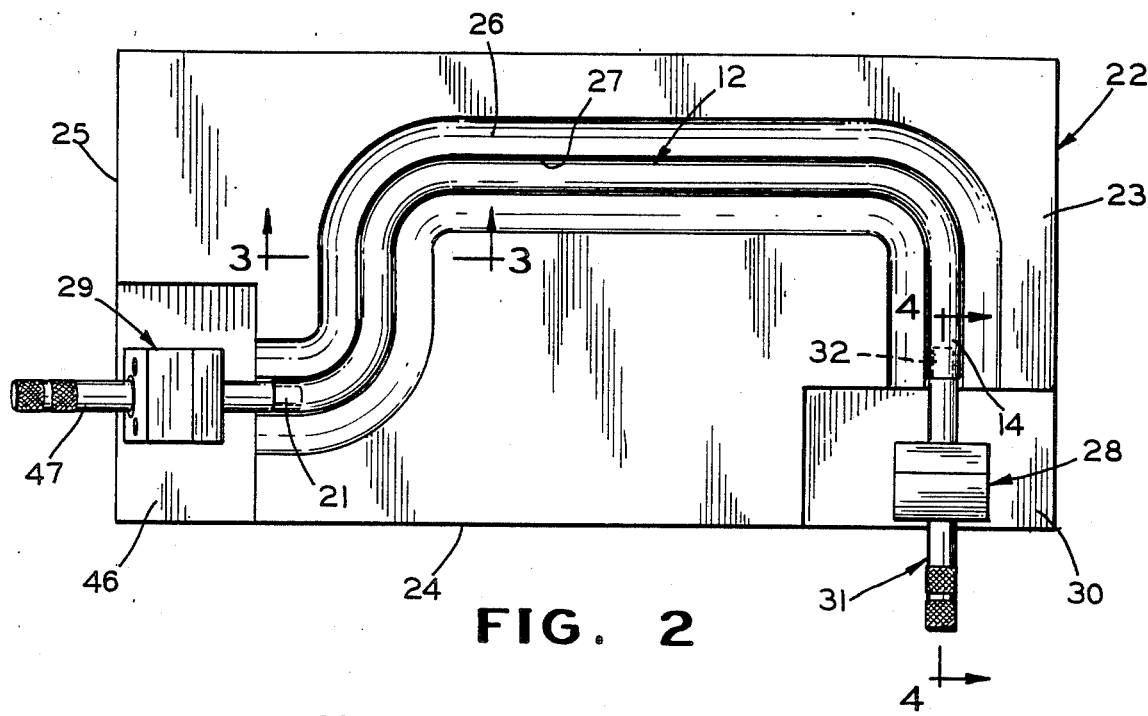
FIG. 2 is a top plan view of the fixture shown in FIG. 1 with the tube inserted into the fixture.
Figure 4:
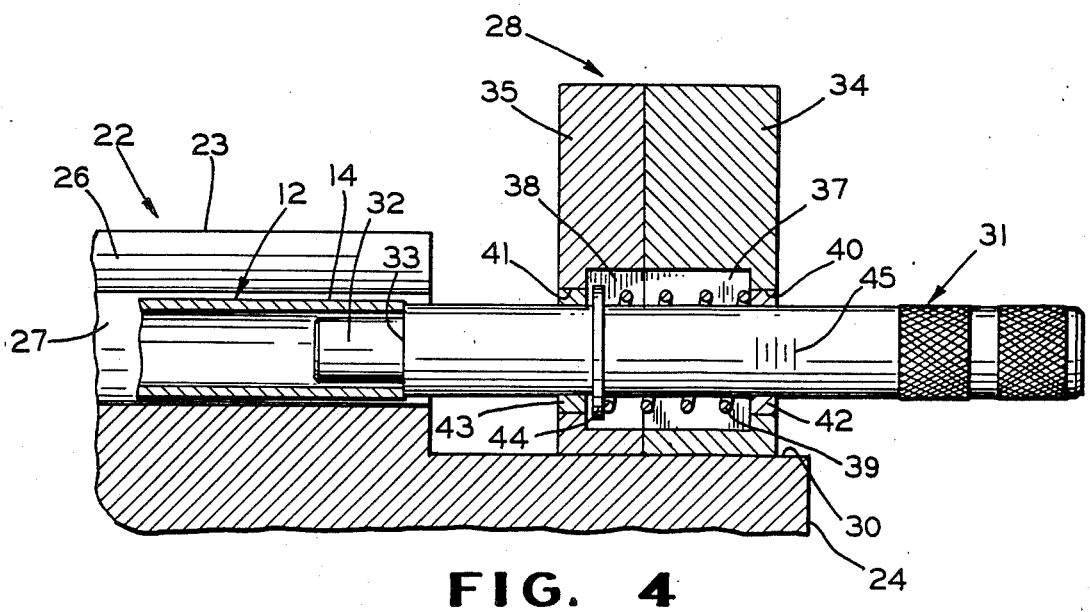
FIG. 4 is an enlarged, fragmentary cross-sectional view taken along the line 4—4 in FIG. 2.

As shown in FIGS. 1 and 2, a pair of locating blocks 28 and 29 are provided for engaging the free ends 14 and 21 respectively thereby locating the tube in a desired orientation in the envelope groove 27. The locator block 28 is attached to an upwardly facing mounting surface 30 by any suitable means (not shown). The mounting surface 30 is formed generally parallel to and below the working surface 23 and the bottom of the envelope groove 27. As best shown in FIG. 4, the locator block 28 includes a locator pin 31 having a reduced diameter end 32 for insertion into the free end 14 of the tubing 12. The diameter of the end 32 is equal to the minimum inside diameter of the tube 12 in order to check that dimension. A step 33 is formed at the junction of the reduced diameter end 32 and the larger diameter body of the locator pin 31. The step 33 engages the edge of the free end 14 and is utilized in the checking of another dimension as will be discussed below. The longitudinal axis of the locator pin 31 is positioned relative to the sides of the envelope groove 27 such as to locate the tube 12 in the nominal center of the envelope. Thus, the tube 12 is supported by the reduced diameter end 32 above the bottom of the envelope groove 27 as shown in FIG. 4.

The locator block shown in FIG. 4 is formed of a pair of body halves 34 and 35 which can be held together by one or more fasteners such as screws 36 shown in FIG. 1. The body halves 34 and 35 are formed with facing internal cavities 37 and 38 respectively for retaining a helical biasing spring 39. Although a helical spring 39 is shown, other types of springs and biasing means can be utilized. The blocks 34 and 35 have opposed apertures 40 and 41 formed therein respectively which apertures connect the cavities 37 and 38 with the exterior of the locator block. The larger diameter body portion of the locator pin 31 extends through the apertures 40 and 41 and the cavities 37 and 38. The apertures 40 and 41 can be provided with bushings 42 and 43 respectively which bushings function as sleeve bearings for sliding movement of the locator pin 31.

The larger diameter portion of the locator pin 31 extends through the center of the biasing spring 39 and has an outwardly extending flange 44 formed thereon which flange is located in the internal cavity 38 when the pin 31 is in the position shown in FIG. 4 under the influence of the biasing spring 39. The spring 39 extends between the wall of the cavity 37 in which the aperture 40 is formed and the opposing face of the flange 44. The flange 44 is shown as being positioned away from the wall of the cavity 38 containing the aperture 41. The position of the flange 44 relative to the walls of the cavities 37 and 38 is determined by the position at which the end 14 of the tube 12 abuts the step 33. The locator block 28 can be constructed and located such that the flange 44 is spaced from but adjacent to the wall containing the aperture 41 when the step 33 is located at the one extreme of the tolerance range for the location of the end 14 of the tube 12. If the end 14 is actually located farther to the right in FIG. 4, the locator pin 31 will be moved to compress the spring 39. Obviously, the range of tolerances for the end 14 of the tube 12 should be such that the spring 39 is compressed slightly for short tubes and is not fully compressed for long tubes at extremes of the tolerance range. As an aid in determining whether the end 14 of the tube 12 is within the tolerance range, indicia 45 are provided on the larger diameter portion of the body of the locator pin 31. For example, the longer lines 45 can represent the mid point and end points of the tolerance range while the shorter lines 45 can represent distances halfway between the center and the end point. Utilizing the indicia 45 which are visible beyond the outer wall of the body half 34, an operator can easily determine whether the end 14 of the tube 12 is within the desired tolerance range.

The locator block 29 is similar in construction to the locator block 28 and is attached to an upwardly facing surface 46. The mounting surface 46 is recessed below the working surface 23 and is inclined with respect to horizontal in order to match the degree of inclination of the fourth straight section 20 and the third curved section 19. The locator block 29 includes a spring biased locator pin 47 which engages the internal diameter of the second free end 21 of the tube 12 in a manner similar to the locator pin 31 associated with the locator block 28. Thus, the locator pins 31 and 47 not only position the ends of the tube 12 within the "error envelope" defined by the envelope groove 27, but they serve as an indicator for the horizontal positions of the free ends 14 and 21.

In operation, the tube 12 is placed into the envelope groove 27 with the free ends 14 and 21 resting on top of the reduced diameter ends of the locator pins 31 and 47. Either one of the locator pins 31 and 47 is then moved in a direction to compress its associated biasing spring thereby allowing the free end of the tube 12 to clear the reduced diameter end. When the free end is aligned with the reduced diameter end, the locator pin is allowed move under the influence of the biasing spring to engage the edge of the tube with the associated step on the locator pin. A similar procedure is followed with the locator pin associated with the other free end of the tube 12 thereby positioning the ends of the tube in the center of the "error envelope" defined by the envelope groove 27. The tube 12 is an acceptable part if the indicia on the locator pins 31 and 47 show that the tube ends fall within the tolerance ranges and no portion of the tube 12 extends above the upper edge of the envelope groove 27.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A fixture assembly for inspecting a formed hollow tube for a predetermined configuration, comprising:
    a base having a working surface with an envelope groove formed therein, said envelope groove having dimensions approximately equal to the maximum dimensions defining an error envelope for a formed hollow tube;
    a locator block positioned at one end of said envelope groove and attached to said base;
    a locator pin slidably mounted in said locator block and having one end adapted to engage a free end of a formed hollow tube positioned in said envelope groove; and
    biasing means for urging said locator pin toward said one end of said envelope groove.

2. The assembly according to claim 1 wherein said base includes a working channel formed in said working surface and said envelope groove is formed in a bottom of said working channel.

3. The assembly according to claim 1 wherein said locator block has an internal cavity formed therein for retaining said biasing means and one end of said locator pin extends into said cavity.

4. The assembly according to claim 3 wherein said locator pin has a radially outwardly extending flange formed thereon and positioned in said cavity, and said biasing means is a helical spring extending between said flange and a wall of said cavity.

5. The assembly according to claim 1 wherein said locator block includes bearing means slidably engaging said locator pin.

6. The assembly according to claim 1 wherein said locator block has an internal cavity and a pair of apertures formed therein, said apertures communicating between said cavity and an external surface of said locator block, and said locator pin is slidably retained in said apertures and passes through said cavity.

7. The assembly according to claim 6 wherein said locator pin has a radially outwardly extending flange formed thereon and said biasing means is positioned between said flange and a wall of said cavity.

8. The assembly according to claim 1 wherein said one end of said locator pin is of reduced diameter.

9. The assembly according to claim 1 wherein said one end and a larger diameter portion of said locator pin form a step adapted to engage an edge of a free end of a formed hollow tube positioned in said envelope groove.

10. In a fixture assembly having a base with a working surface including an envelope groove formed therein for accepting a formed hollow tube having at least one free end, and a locator means attached to the base for engaging the one free end to position the formed hollow tube, the locator means comprising:
- a locator block having an internal cavity formed therein and at least one aperture communicating between said cavity and an external surface of said locator block;
- a locator pin slidably retained in said aperture and having one end external to said locator block adapted to engage a free end of a formed hollow tube, and an opposite end of said locator pin extending into said cavity; and
- biasing means located in said cavity and cooperating with said opposite end of said locator pin to urge said locator pin one end into engagement with a free end of a formed hollow tube.

11. The assembly according to claim 10 wherein said locator block has a second aperture formed therein communicating between said cavity and said external surface, said locator pin slidably retained in said second aperture and extending through said cavity.

12. The assembly according to claim 11 wherein said locator pin has a radially outwardly extending flange formed thereon and positioned in said cavity, and said biasing means includes a helical spring extending around said locator pin and between said flange and a wall of said cavity.

13. The assembly according to claim 12 wherein said locator block includes a bushing retained in each of said apertures for slidably engaging said locator pin.

14. The assembly according to claim 12 wherein said locator pin has indicia formed thereon cooperating with said locator block for indicating the position of a free end of a hollow tube engaged by said one end.

15. A fixture assembly for inspecting a formed hollow tube with two free ends, comprising:
- a base having a working surface with an envelope groove formed therein, said envelope groove adapted to accept a formed hollow tube with free ends adjacent ends of said envelope groove and defining an error envelope for the tube;
- a pair of locator blocks attached to said base each said locator block adjacent to one of said ends of said envelope groove, each said locator block slidably retaining a locator pin having a longitudinal axis oriented to define a central position for the associated free end of a formed hollow tube positioned in said envelope groove, at least one of said locator pins including indicia formed thereon cooperating with an associated one of said locator blocks for indicating the position of a free end of a formed hollow tube; and
- biasing means for urging each of said locator pins toward the associated one of said envelope groove ends.

16. The assembly according to claim 15 wherein the longitudinal axis of at least one of said locator pins extends at an angle with respect to a plane defined by said working surface.

* * * * *